(12) United States Patent
Hiura et al.

(10) Patent No.: US 8,723,375 B2
(45) Date of Patent: May 13, 2014

(54) LINEAR ACTUATOR

(75) Inventors: Ryota Hiura, Hyogo (JP); Takakatsu Nozawa, Hyogo (JP); Katsuhiro Hirata, Osaka (JP); Hiroshi Ishiguro, Osaka (JP); Yoshihiro Nakata, Osaka (JP)

(73) Assignees: Mitsubishi Heavy Industries, Ltd., Tokyo (JP); Osaka University, Osaka (JP)

( * ) Notice: Subject to any disclaimer, the term of this patent is extended or adjusted under 35 U.S.C. 154(b) by 329 days.

(21) Appl. No.: 13/125,087

(22) PCT Filed: Oct. 28, 2009

(86) PCT No.: PCT/JP2009/068511
§ 371 (c)(1),
(2), (4) Date: Apr. 20, 2011

(87) PCT Pub. No.: WO2010/053031
PCT Pub. Date: May 14, 2010

(65) Prior Publication Data
US 2011/0193425 A1    Aug. 11, 2011

(30) Foreign Application Priority Data
Nov. 5, 2008 (JP) ................ 2008-284380

(51) Int. Cl.
*H02K 41/03* (2006.01)
*H02K 41/00* (2006.01)

(52) U.S. Cl.
USPC .......... 310/12.01; 310/12.02; 310/12.24; 310/12.25; 310/12.33; 310/156.18

(58) Field of Classification Search
USPC ............ 310/12.01–12.49, 156.18, 156.22, 310/216.127
See application file for complete search history.

(56) References Cited

FOREIGN PATENT DOCUMENTS

| | | |
|---|---|---|
| CN | 101227133 | 7/2008 |
| JP | 2001-8430 | 1/2001 |
| JP | 2003-70226 | 3/2003 |
| JP | 2007-6545 | 1/2007 |
| JP | 2007-110822 | 4/2007 |
| JP | 2007-312449 | 11/2007 |
| JP | 2008-193760 | 8/2008 |
| WO | 2006/035835 | 4/2006 |
| WO | 2008/013053 | 1/2008 |

OTHER PUBLICATIONS

International Search Report issued Jan. 26, 2010 in International (PCT) Application No. PCT/JP2009/068511.
GMC Hillstone, Co., Ltd., (http://www.ghc.co.jp/product/shaft.html), Apr. 18, 2011.

(Continued)

*Primary Examiner* — Tran Nguyen
*Assistant Examiner* — Leda Pham
(74) *Attorney, Agent, or Firm* — Wenderoth, Lind & Ponack, L.L.P.

(57) ABSTRACT

A linear actuator includes a coil portion and a shaft portion. The coil portion includes a plurality of coils respectively applied with AC currents having different phases from one another. The shaft portion passes through an inside of the plurality of coils. The shaft portion includes: a plurality of permanent magnets and a plurality of intermediate members. The plurality of permanent magnets is arranged along a central axis C such that opposite magnetization directions face to each other in a direction of the central axis C. Each of the plurality of intermediate members is arranged between adjacent two of the plurality of permanent magnets. A saturation magnetic flux density of each of the plurality of intermediate members is higher than a saturation magnetic flux density of each of the plurality of permanent magnets.

20 Claims, 8 Drawing Sheets (56) References Cited

OTHER PUBLICATIONS

Chinese Office Action issued Jan. 22, 2013 in corresponding Chinese Patent Application No. 200980141588.X with English translation.

Japanese Decision to Grant a Patent issued Oct. 28, 2013 in corresponding Japanese Patent Application No. 2008-284380 with English translation.

Chinese Decision to Grant a Patent issued Feb. 28, 2014 in corresponding Chinese Patent Application No. 200980141588.X with partial English translation.

16a1: YOKE MEMBER

LINEAR ACTUATOR

TECHNICAL FIELD

The present invention relates to a linear actuator, and more particularly, relates to a linear actuator using a principle of a linear synchronous motor.

BACKGROUND ART

There is known a linear synchronous motor that is a linear motor using attractive force and repulsive force between magnetic poles of a magnet. As one type of the linear synchronous motor, there is a shaft motor. The shaft motor is disclosed in, for example, a homepage of GMC Hillstone, Co., Ltd. (http://www.ghc.co.jp/product/shaft.html).

Figure 1:
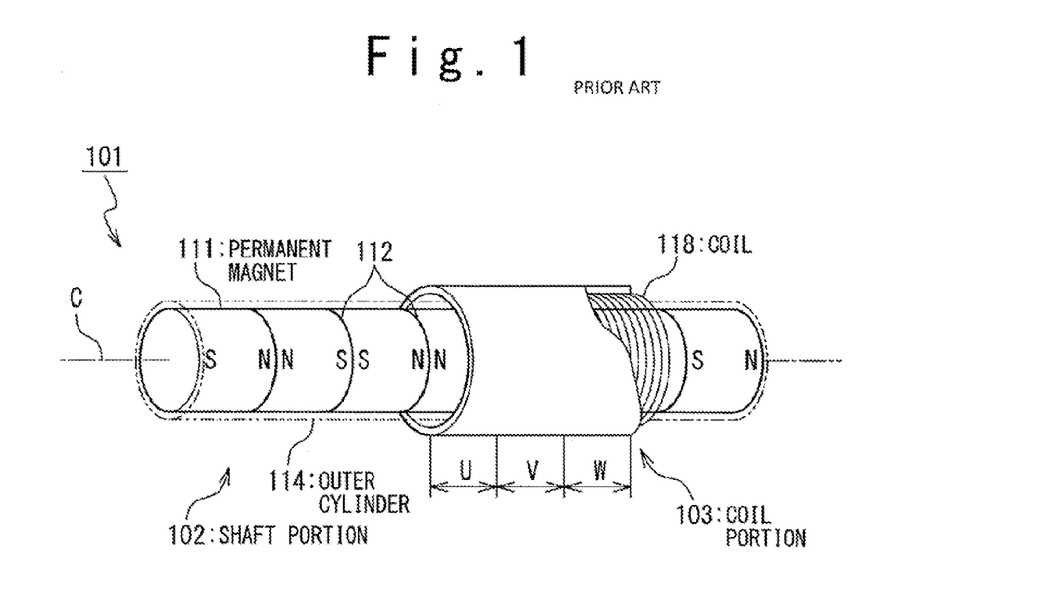
FIG. 1 is a schematic diagram illustrating a configuration of a shaft motor manufactured by GMC Hillstone, Co., Ltd.

FIG. 1 is a schematic diagram illustrating a configuration of the shaft motor. The shaft motor 101 includes a shaft portion 102 and a coil portion 103. The shaft portion 102 is provided with a plurality of permanent magnets 111 and an outer cylinder 114. The plurality of permanent magnets 111 is arranged along a central axis C such that opposite magnetic directions face to each other in a direction of the central axis C. That is, along the central axis C, N poles are joined to each other, and S poles are joined to each other. For this reason, from joining portions 112, strong magnetic field lines are generated. The outer cylinder 114 is a cylinder that integrally contains the plurality of permanent magnets 111. On the other hand, the coil portion 103 is provided with a coil 118. The coil 118 includes a plurality of coils (e.g.: for U phase, for V phase, and for W phase) which has a common central axis and is respectively applied with AC currents with different phases from one another. The shaft portion 102 passes through an inside of the plurality of coils 118. When the currents flow through the plurality of coils 118 surrounding the shaft portion 102, a magnetic field is generated, whereby thrust force is generated on the basis of the Fleming's left-hand rule. The thrust force allows the coil portion 103 to perform linear motion along the central axis C.

The shaft motor 101 has features, for example, attractive force does not act between the coil 118 and the shaft portion 102, magnetic flux of the magnet 111 can be effectively utilized all around the magnet 111 without wasting to achieve high thrust force, and other features. The shaft motor can be used as a mechanical element substituting a ball screw or as a linear actuator as one of actuators, with use of its functions and features.

As a related technique, a linear synchronous motor is disclosed in Japanese Patent Publication JP2003-70226A. This linear synchronous motor includes a primary mover having a coil and a secondary stator in which a plurality of permanent magnets are disposed along a straight line, and moves the mover along the secondary stator linearly by energization of the coil. In the linear synchronous motor, the plurality of permanent magnets is disposed adjacent to each other, and magnetization directions of the permanent magnets adjacent to each other are shifted by 90 degrees in each moving direction and orthogonal direction of the mover.

Also, Japanese Patent Publication JP2007-6545A discloses a periodical magnetic field generator and a linear motor, a rotary motor and an oscillating motor using the generator. The periodical magnetic field generator includes a field pole of Halbach array structure composed of a main pole permanent magnet magnetized in a direction of generation magnetic field, and a sub-pole permanent magnet magnetized differently from the direction of the magnetic pole of the main pole permanent magnet. In the periodical magnetic field generator, a part of the main pole permanent magnet on a side of the magnetic field generation is replaced by a soft magnetic material.

The inventors have now newly discovered the following fact. It is considered that the above-described shaft motor 101 has the following problems. The first problem is that the magnets 111 are arranged with facing to each other and being in direct contact with each other. Therefore, the magnets 111 facing to each other mutually weaken their magnetic fields. That is, an operating point of the magnet around a contact surface is varied by the influence of the magnetic field generated by the adjacent magnet. Therefore, the magnet is in the state where the magnet cannot exert its performance sufficiently. Also, the second problem is that magnetic flux on the contact surface of the magnet 111 should pass through the inside of the magnets 111 on both sides of the contact surface. Therefore, an intensity of the magnetic flux is limited by saturation magnetic flux densities of the magnets 111. For this reason, it is considered that an intensity of magnetic force of each of the magnets 111 cannot be sufficiently utilized. The third problem is that the magnets 111 are arranged with facing to each other and the adjacent magnets 111 repel each other, thereby being difficult to assemble the motor. In particular, to increase the thrust force, magnetic force of the magnet 111 should be increased. However, if so, it is expected that the assembling becomes increasingly difficult. The fourth problem is that the tubular outer cylinder 114 that contains the magnets 111 is indispensable in order to fix the magnets 111. For this reason, a gap between the coils 118 and the magnets 111 is increased due to the presence of the outer cylinder 114, thereby reducing the thrust force.

In the case of using the above-described shaft motor as a linear actuator, a technique is desired that can sufficiently utilize an intensity of magnetic force of the magnets. A technique is desired that can facilitate the assembling of the shaft motors. A technique is required that can reduce the gap between the coil and the magnets to increase the thrust force.

CITATION LIST

Patent Literature

Patent literature 1: JP2003-70226A
Patent literature 2: JP2007-6545A

Non Patent Literature

Non patent literature 1:
http://www.ghc.co.jp/product/shaft.html

SUMMARY OF INVENTION

An object of the present invention is to provide a linear actuator that can sufficiently utilize an intensity of magnetic force of a magnet. Another object of the present invention is to provide a linear actuator that enables assembling to be facilitated. Still another object of the present invention is to provide a linear actuator that enables a gap between a coil and a magnet to be reduced to increase thrust force.

A linear actuator of the present invention includes a coil portion and a shaft portion. The coil portion includes a plurality of coils respectively applied with AC currents having different phases from one another. The shaft portion passes through an inside of the plurality of coils. The shaft portion includes a plurality of permanent magnets and a plurality of intermediate members. The plurality of permanent magnets is arranged along a central axis such that opposite magnetization directions face to each other in a direction of the central axis. Each of the plurality of intermediate members is arranged between adjacent two of the plurality of permanent magnets. A saturation magnetic flux density of each of the plurality of intermediate members is higher than a saturation magnetic flux density of each of the plurality of permanent magnets.

In the present invention, between the permanent magnets facing to each other, a soft magnetic material as the intermediate member is inserted, the soft magnetic material having a saturation magnetic flux density higher than that of the permanent magnet. On the basis of the property that the saturation magnetic flux density of the intermediate member is higher than the saturation magnetic flux density of the permanent magnet, magnetic fluxes of the permanent magnets facing to each other can both pass through the intermediate member to exit to a direction substantially perpendicular to the central axis or enter from the same direction, while having the magnetic flux density higher than that in the case of a configuration only including the permanent magnets. This enables a magnetic flux density to be increased at a position of the coil portion. That is, the magnets facing to each other do not weaken their magnetic fields, and therefore an intensity of magnetic force of each of the magnets can be sufficiently utilized. This enables thrust force of the linear actuator to be increased. Also, by making the intermediate member intervene between the magnets, mutual repulsive force between the magnets adjacent to each other can be weakened. This enables assembling of the shaft portion to be facilitated. That is, manufacturing of the linear actuator can be facilitated.

In the present invention, since the soft magnetic material is used as the intermediate member, magnetic saturation due to the concentration of magnetic fluxes between the permanent magnets facing to each other can be prevented at low cost. For this reason, the thrust force of the linear actuator can be improved at low cost.

In the linear actuator of the present invention, each of the plurality of intermediate members includes an intermediate magnet member formed of a magnet material. In this case, the intermediate magnet members are preferably arranged along the central axis such that magnetization directions are perpendicularly outward and perpendicularly inward with respect to the direction of the central axis alternately.

In the present invention, since the intermediate member guides the magnetic fluxes in the direction substantially perpendicular to the central axis, the permanent magnets facing to each other do not weaken their magnetic fields. In addition, by adding magnetic force of the intermediate member, the magnetic flux density in the coil portion can be increased. As a result, the thrust force of the linear actuator can be increased.

Here, in the above-described linear actuator, a thickness of each of the plurality of intermediate members in the central axis direction is preferably thinner than a thickness of each of the plurality of permanent magnets in the central axis direction.

In the present invention, by making the thickness of the intermediate member thinner than the thickness of the permanent magnet, the thrust force of the linear actuator can be increased.

In the above-described linear actuator, preferably, each of the plurality of intermediate members further includes a yoke member that surrounds the intermediate magnet member and is formed of a soft magnetic material.

In the present invention, the soft magnetic material and the magnet material are used in combination as the intermediate member. For this reason, while the magnetic saturation due to the concentration of the magnetic fluxes between the permanent magnets facing to each other can be prevented and while the magnetic flux density can be increased due to increase of a volume of the magnets, a part of the intermediate member is formed of the soft magnetic material which leads to low cost. This enables the magnetic flux density in the coil portion to be increased at low cost. As a result, the thrust force of the linear actuator can be increased with keeping cost low.

In the above-described linear actuator, each of the plurality of intermediate members has the thickness in the central axis direction, which preferably increases with increasing a distance from the central axis.

In the present invention, the thickness of the intermediate member near the central axis where a concentration degree of magnetic fluxes is relatively small is made thinner, whereas the thickness of the intermediate member near a surface where a concentration degree of the magnetic fluxes is relatively large is made thicker. This enables the occurrence of the magnetic saturation due to the concentration of the magnetic fluxes in the intermediate member to be reduced. As a result, the magnetic flux density in the coil portion can be further increased. Accordingly, the thrust force of the linear actuator can be increased.

In the above-described linear actuator, the shaft portion preferably further includes a fixed shaft member that penetrates through the plurality of permanent magnets and the plurality of intermediate members to fix them.

The present invention has the fixed shaft member that penetrates through the permanent magnets and intermediate members to fix them, and therefore a tubular outer cylinder for fixing the permanent magnets is not required. For this reason, a gap between the magnets and the coils can be decreased. This enables the magnetic flux density in the coil portion to be increased to increase the thrust force of the linear actuator.

In the above-described linear actuator, the shaft portion and the coil portion preferably have shapes whose cross-sectional shapes perpendicular to the central axis are polygonal.

In the present invention, the cross-sectional shapes are polygonal, and therefore the coil portion is unlikely to rotate in a circumferential direction. For this reason, the coil portion can be smoothly operated in the central axis direction.

According to the present invention, in the linear actuator, an intensity of magnetic force of the magnets can be sufficiently utilized. Also, in the linear actuator, assembling can be facilitated. Further, in the linear actuator, the gap between the coils and the magnets can be reduced to increase the thrust force.

BRIEF DESCRIPTION OF DRAWINGS

The above and other objects, advantages and features of the present invention will be more apparent from the following description of certain preferred embodiments taken in conjunction with the accompanying drawings, in which.

DESCRIPTION OF EMBODIMENTS

Embodiments of a linear actuator of the present invention will hereinafter be described referring to the accompanying drawings.

(First Embodiment)

First, a configuration of a linear actuator according to a first embodiment of the present invention will be described.

Figure 2A:
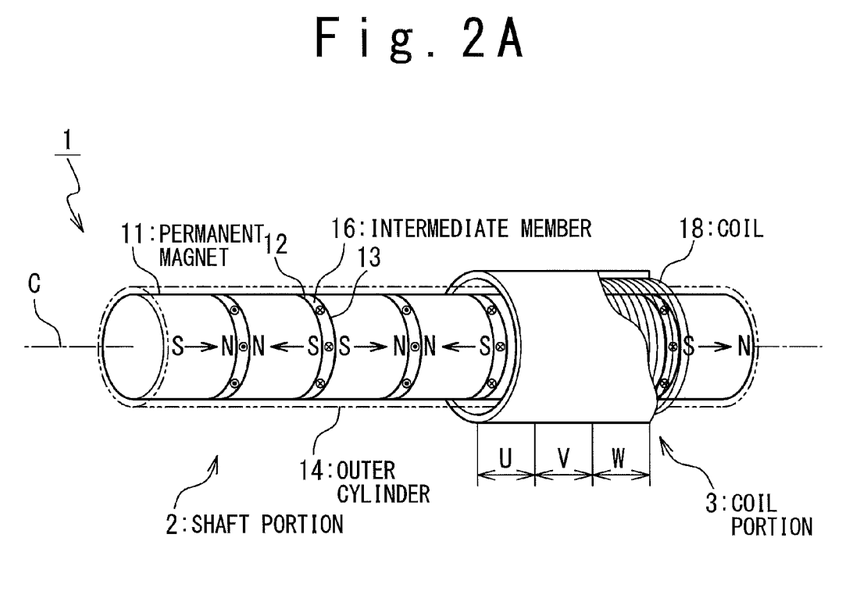
FIG. 2A is a schematic perspective view illustrating a configuration of a linear actuator according to a first and second embodiment of the present invention.
Figure 2B:
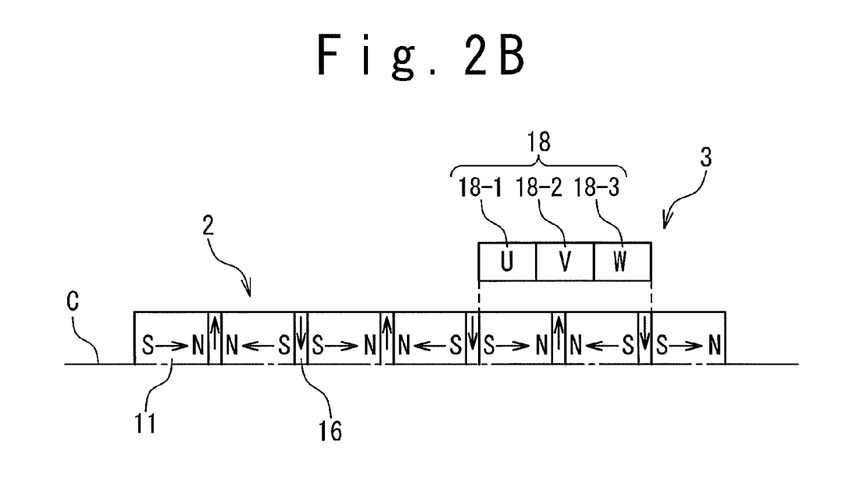
FIG. 2B is a schematic view illustrating the configuration of the linear actuator according to the first and second embodiment of the present invention.

FIGS. 2A and 2B are a schematic perspective view and a schematic view illustrating the configuration of the linear actuator according to the first embodiment of the present invention. Any of an arrow, a symbol denoted by "a circle with a dot" (direction toward the near side), and a symbol denoted by "a circle with an X" (direction toward the far side) in the diagrams represents a magnetization direction or a direction of a magnetic field line (hereinafter, it is the same as each of the drawings). As illustrated in FIG. 2A, a shaft motor 1 includes a shaft portion 2 and a coil portion 3. A shape of the shaft portion 2 is rod-like, and for example, columnar. A shape of the coil portion 3 is tubular, and for example, cylindrical. The shaft portion 2 is arranged so as to pass inside the coil portion 3. Central axes of the shaft portion 2 and the coil portion 3 substantially overlap with each other (hereinafter referred to as a central axis C). By applying a current through the coil portion 3, the coil portion 3 relatively moves on the shaft portion 2 in a direction of the central axis C.

The shaft portion 2 includes a plurality of permanent magnets 11, a plurality of intermediate members 16, and an outer cylinder 14.

The plurality of permanent magnets 11 is arranged along the central axis C such that opposite magnetization directions face to each other in the direction of the central axis C. That is, along the central axis C, N poles are arranged with facing to each other, and S poles are arranged with facing to each other. Each permanent magnet 11 has, for example, a substantially columnar shape. A central axis of the permanent magnet 11 corresponds to the central axis C. As the permanent magnet 11, any of various types of conventionally known permanent magnets can be used, and for example, a ferrite magnet or rare earth magnet can be used.

Each intermediate member 16 is arranged between two adjacent permanent magnets 11. That is, the intermediate member 16 is sandwiched between either two N poles or two S poles. The intermediate member 11 has, for example, a substantially columnar shape. A central axis of the intermediate member 11 corresponds to the central axis C. A saturation magnetic flux density of the intermediate member 16 is higher than that of the permanent magnet 11. For this reason, magnetic fluxes exiting from the two N poles can pass not through the permanent magnets 11 but through an inside of the intermediate member 16 sandwiched between the two N poles outward. Also, the magnetic fluxes toward the two S poles can pass not through the permanent magnets 11 but through intermediate members 16 each sandwiched between two S poles inward.

The outer cylinder 14 is provided outside the plurality of permanent magnets 11 and plurality of intermediate members 16 so as to surround (contain) them. That is, the outer cylinder 14 has a substantially cylindrical shape. A central axis of the outer cylinder 14 corresponds to the central axis C. The outer cylinder 14 is formed of a non-magnetic material.

On the other hand, the coil portion 3 includes a plurality of coils 18.

The plurality of coils 18 is arranged adjacent to each other along the central axis C so as to surround the shaft portion 2 and not to be in contact with the shaft portion 2. Each coil 18 is coiled up a substantially cylindrical shape. A central axis of the cylindrical shape corresponds to the central axis C. The plurality of coils 18 are applied with AC currents respectively having different phases from one another. Here, as illustrated in FIG. 2B, the coil portion 3 has three phase coils 18, i.e., a U phase coil 18-1, a V phase coil 18-2, and a W phase coil 18-3, and the respective coils 18 are applied with the AC currents having phases mutually shifted by ($2\pi/3$) from one another. Also, as illustrated in the diagram, corresponding to one period including the permanent magnet 11/the intermediate member 16/the permanent magnet 11/the intermediate member 16, a set of U phase coil 18-1/V phase coil 18-2/W phase coil 18-3 is provided.

The shaft portion 2 passes through the inside of the plurality of coils 18. Also, through an intermediate member 16 between two N poles, magnetic field lines indicated by an outward arrow pass, and through an intermediate member 16 between two S poles, magnetic field lines indicated by an inward arrow pass. When the currents are applied to the plurality of coils 18 surrounding the shaft portion 2, on the basis of the Fleming's left-hand rule, thrust force is generated by a component perpendicular to the axis out of a magnetic field generated by the shaft portion. The thrust force allows the coil portion 3 to perform relatively linear motion on the shaft portion 2 along the central axis C.

In the present embodiment, between the permanent magnets 11 facing to each other, the intermediate member 16 is inserted. The saturation magnetic flux density of the intermediate member 16 is higher than that of the permanent magnet 11. For this reason, magnetic fluxes of the permanent magnets 11 facing to each other can both pass through the inside of the intermediate member 16 to exit to a direction substantially perpendicular to the central axis C, and to enter from a direction substantially perpendicular to the central axis C, without being limited by the saturation magnetic flux densities of the permanent magnets 11 and also without causing magnetic saturation in the intermediate member 16. This enables a magnetic flux density at a position of the coil portion 3 to be increased. Also, since the magnets 11 facing to each other do not mutually weaken their magnetic fields, an intensity of magnetic force of each magnet 11 can be sufficiently utilized. This enables the thrust force of the linear actuator to be increased.

Also, by making the intermediate member 16 intervene, mutual repulsive force between the permanent magnets 11 adjacent to each other can be weakened. This enables N poles or S poles to be easily coupled with being facing to each other. That is, by sandwiching the intermediate member 16 between the permanent magnets 11, assembling of the shaft portion 2 can be facilitated, thereby enabling manufacture of the linear actuator to be facilitated.

Figure 3A:
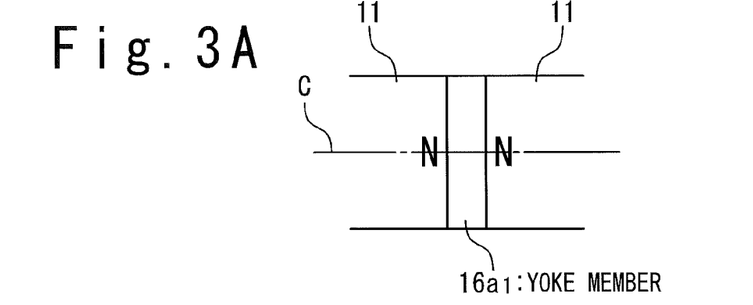
FIG. 3A is a schematic cross-sectional view illustrating an example of a specific configuration of an intermediate member according to the first embodiment of the present invention.
Figure 3B:
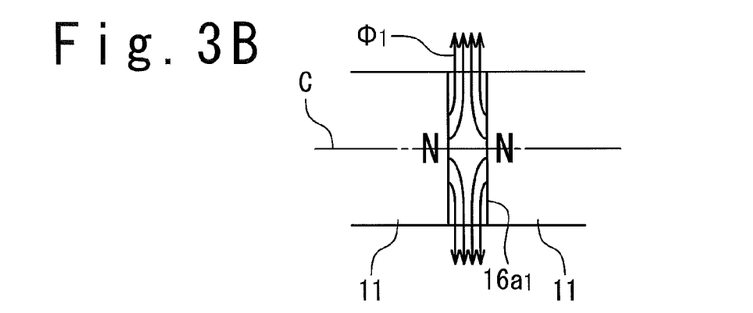
FIG. 3B is a schematic cross-sectional view illustrating the example of the specific configuration of the intermediate member according to the first embodiment of the present invention.

FIGS. 3A and 3B are schematic cross-sectional views illustrating an example of a specific configuration of the intermediate member according to the first embodiment of the present invention. In this example, the intermediate member 16 sandwiched between two N poles is described; however, this case is the same as the case of the intermediate member 16 sandwiched between two S poles except for a direction of magnetic flux. The intermediate member 16 illustrated in FIG. 3A is a yoke member 16a₁ formed of a soft magnetic material (high magnetic permeability material). The saturation magnetic flux density of the soft magnetic material is, as already described, higher than that of the permanent magnet 11, and more preferably twice higher than that of the permanent magnet 11. The soft magnetic material is exemplified by pure iron (electromagnetic soft iron or the like), permalloy, or silicon steel.

As illustrated in FIG. 3B, magnetic flux lines $\phi 1$ can pass through the yoke member 16a₁ having the high saturation magnetic flux density from end parts (N poles) of the permanent magnets 11 to exit to an outside direction substantially perpendicular to the central axis C. That is, through the yoke member 16a₁, magnetic fields can be guided outside to increase a magnetic flux density in the direction perpendicular to the central axis C at the position of the coil portion 3. As a result, the thrust force of the linear actuator can be increased. For example, as compared with a result of an experiment under the same condition except for the insertion of the yoke members 16a₁, a thrust force increase of +8.9% has been verified.

In addition, by sandwiching the yoke members 16a₁ between the permanent magnets 11, the mutual repulsive force between adjacent permanent magnets 11 can be weakened to facilitate the assembling of the shaft portion 2. This enables the manufacturing of the linear actuator to be facilitated. Also, since a portion of the permanent magnets 11 made of an expensive material is reduced, cost of the linear actuator can be reduced.

Figure 4A:
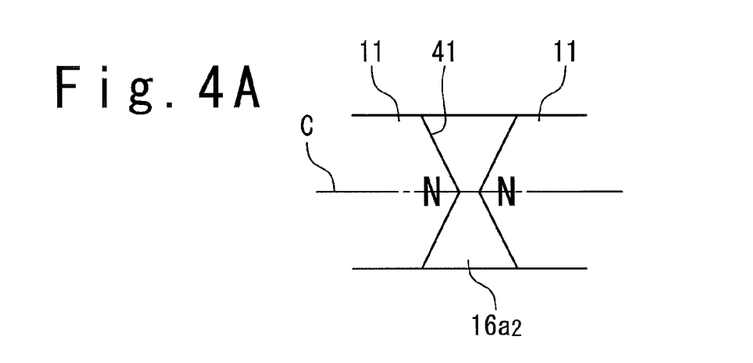
FIG. 4A is a schematic cross-sectional view illustrating another example of a specific configuration of the intermediate member according to the first embodiment of the present invention.
Figure 4B:
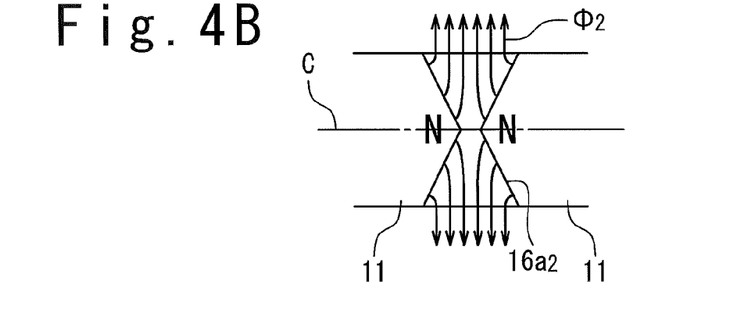
FIG. 4B is a schematic cross-sectional view illustrating the other example of the specific configuration of the intermediate member according to the first embodiment of the present invention.

FIGS. 4A and 4B are schematic cross-sectional views illustrating another example of the specific configuration of the intermediate member according to the first embodiment of the present invention. In this example, the intermediate member 16 sandwiched between two N poles is described; however, this case is the same as the case of the intermediate member 16 sandwiched between two S poles except for a direction of magnetic flux. The intermediate member 16 illustrated in FIG. 4A is a yoke member 16a₂ formed of a soft magnetic material (high magnetic permeability material). The saturation magnetic flux density of the soft magnetic material is, as already described, higher than that of the permanent magnet 11, and more preferably, twice higher than that of the permanent magnet 11. The soft magnetic material is exemplified by pure iron (electromagnetic soft iron or the like), permalloy, or silicon steel. The yoke material 16a₂ has a thickness in the central axis C direction, which increases with increasing a distance from the central axis C. That is, on two surfaces in contact with the permanent magnets 11, the yoke member 16a₂ has concave portions 41 each having an inverted cone shape around the central axis C.

As illustrated in FIG. 4B, magnetic flux lines $\phi 2$ can pass through the yoke member 16a₂ having the high saturation magnetic flux density from end parts (N poles) of the permanent magnets 11 to exit to an outside direction substantially perpendicular to the central axis C. In this case, the thickness in the central axis C direction increases with increasing a distance from the central axis C, and therefore the concentration of magnetic fluxes can be prevented also in a peripheral part of the yoke member 16a₂ to prevent magnetic saturation from occurring. That is, through the yoke member 16a₂, magnetic fields can be guided outside to increase magnetic flux in the direction perpendicular to the central axis C at the position of the coil portion 3 while preventing the magnetic saturation due to the concentration of magnetic fluxes. As a result, the thrust force of the linear actuator can be further increased.

In addition, by sandwiching the yoke member 16a₂ between the permanent magnets 11, the mutual repulsive force between adjacent permanent magnets 11 can be weakened to facilitate the assembling of the shaft portion 2. This enables the manufacturing of the linear actuator to be facilitated. Also, a portion of the permanent magnets 11 made of an expensive material is reduced, and therefore cost of the linear actuator can be reduced.

Figure 5A:
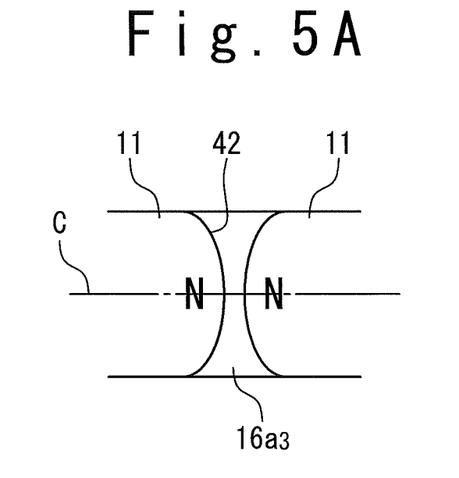
FIG. 5A is a schematic cross-sectional view illustrating still another example of the specific configuration of the intermediate member according to the first embodiment of the present invention.
Figure 5B:
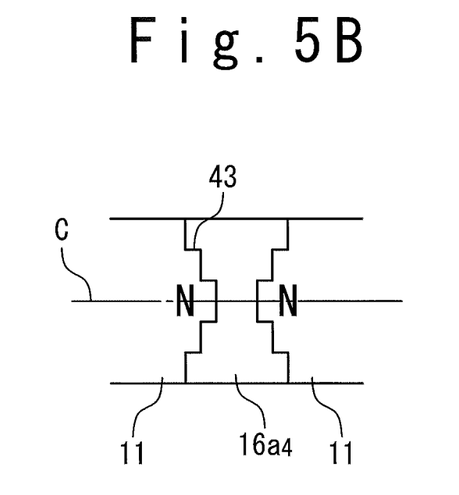
FIG. 5B is a schematic cross-sectional view illustrating yet another example of the specific configuration of the intermediate member according to the first embodiment of the present invention.

FIGS. 5A and 5B are schematic cross-sectional views respectively illustrating other examples of the specific configuration of the intermediate member according to the first embodiment of the present invention. The intermediate members 16 illustrated in FIGS. 5A and 5B are yoke members $16a_3$ and $16a_4$ each formed of a soft magnetic material (high magnetic permeability material). The yoke members $16a_3$ and $16a_4$ have basically the same configuration as that of the yoke member $16a_2$ (i.e., a thickness in the central axis direction C increases with increasing a distance from the central axis C). However, shapes of concave portions 42 and 43 around the central axis C are different from that of the concave portion 41 of the yoke member $16a_2$. That is, the yoke member $16a_3$ in FIG. 5A has a shape having the concave portions 42 each formed with a curved surface (shape like a concave lens). On the other hand, the yoke member $16a_4$ in FIG. 5B has a shape having the concave portions 43 each formed with a plurality of stair-like steps. In any of the shapes, the same effect as that in the shape illustrated in FIGS. 4A and 4B can be obtained.

(Second Embodiment)

First, a configuration of a linear actuator according to a second embodiment of the present invention will be described.

FIGS. 2A and 2B are a schematic perspective view and a schematic view illustrating the configuration of the linear actuator according to the second embodiment of the present invention. In the second embodiment, these diagrams are identical to those in the first embodiment, and therefore description thereof is omitted.

Figure 6A:
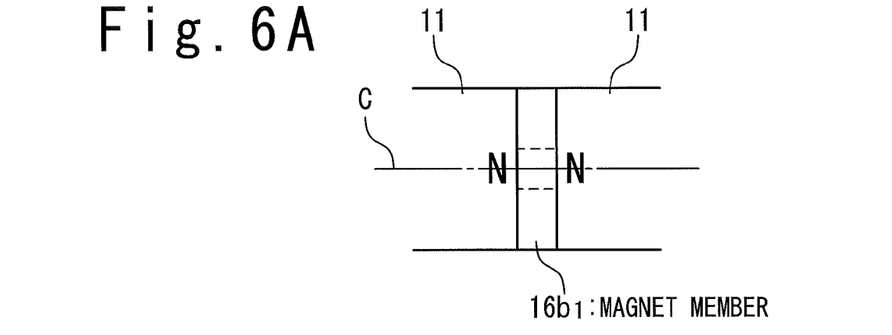
FIG. 6A is a schematic cross-sectional view illustrating an example of a specific configuration of an intermediate member according to a second embodiment of the present invention.

FIGS. 6A to 6D are schematic cross-sectional views illustrating examples of a specific configuration of an intermediate member according to the second embodiment of the present invention. In these example, the intermediate member 16 sandwiched between two N poles is described; however, this case is the same as the case of the intermediate member 16 sandwiched between two S poles except for a direction of magnetic flux. The intermediate member 16 illustrated in FIG. 6A is a permanent magnet member $16b_1$ formed of a hard magnetic material (high coercive force material), and for example, a ferrite magnet or rare earth magnet.

Figure 6B:
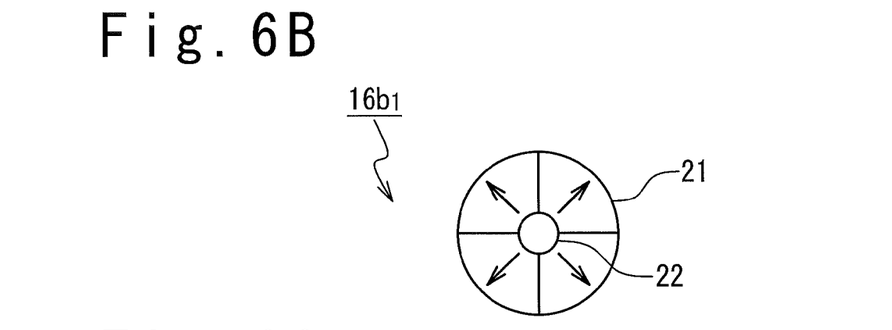
FIG. 6B is a schematic cross-sectional view illustrating an example of the specific configuration of the intermediate member according to the second embodiment of the present invention.
Figure 6C:
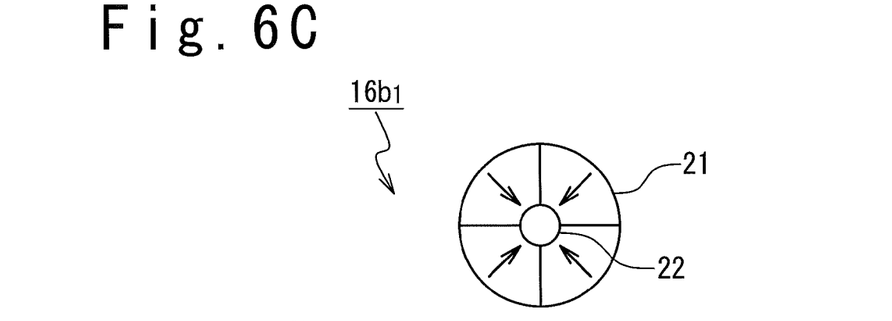
FIG. 6C is a schematic cross-sectional view illustrating an example of the specific configuration of the intermediate member according to the second embodiment of the present invention.
Figure 6D:
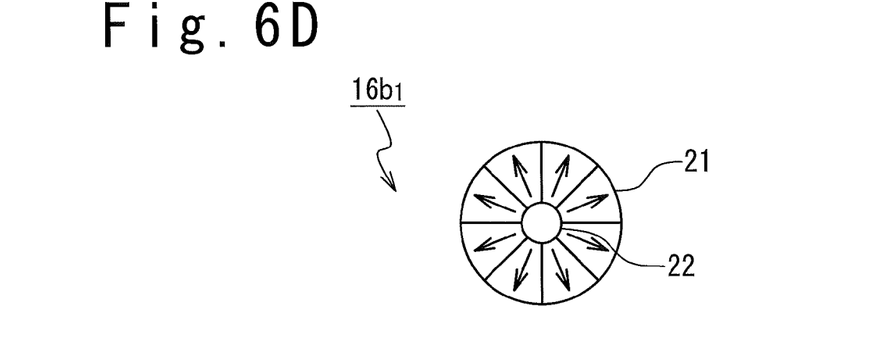
FIG. 6D is a schematic cross-sectional view illustrating an example of the specific configuration of the intermediate member according to the second embodiment of the present invention.

FIG. 6B is a plan view of the magnet member $16b_1$ arranged between two N poles as viewed from a direction of the central axis C. The magnet member $16b_1$ has a circular ring shape that has a cylindrical opening 22 in the center. The magnet member $16b_1$ is formed into the circular ring shape by combining a plurality of fan-shaped magnets 21. By dividing the magnet member $16b_1$, it becomes easy to manufacture the circular ring having magnetization directions radially. In the case of FIG. 6B, four fan-shaped magnets 21 are combined. However, the present invention is not limited to this number, and for example, many more fan-shaped magnet members may be combined (e.g.: in FIG. 6D, six magnets). At the same time, FIG. 6C is a plan view of the magnet member $16b_1$ arranged between two S poles as viewed from the central axis C direction. The magnet member $16b_1$ is also the same as that in the case illustrated in FIG. 6B except that magnetization directions are opposite.

A state of magnetic flux in above FIG. 6A is the same as that in the case of FIG. 3B. Accordingly, a linear actuator using the magnet member $16b_1$ in FIG. 6A can obtain the same effect as that in the case of FIG. 3A. That is, through the magnet member $16b_1$, magnetic fields can be guided outside to increase a magnetic flux density in a direction perpendicular to the central axis C at a position of the coil portion 3. As a result, the thrust force of the linear actuator can be increased. Note that, in this case, as compared with the case of FIGS. 3A and 3B, a magnet volume is increased, and not only magnetic fluxes of permanent magnets 11, but also magnetic flux of the magnet member $16b_1$ itself is added. However, a saturation magnetic flux density of the magnet member $16b_1$ is generally more limited than that of the soft magnetic material $16a_1$ in FIGS. 3A and 3B, and therefore as compared with the case of FIGS. 3A and 3B, it cannot be determined which one is excellent in performance.

Figure 7A:
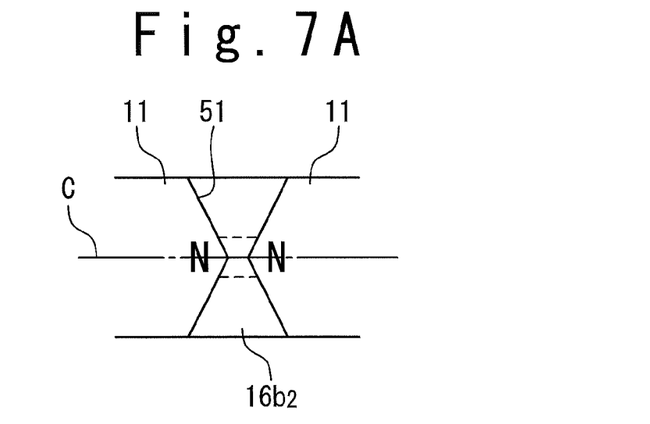
FIG. 7A is a schematic cross-sectional view illustrating another example of the specific configuration of the intermediate member according to the second embodiment of the present invention.
Figure 7B:
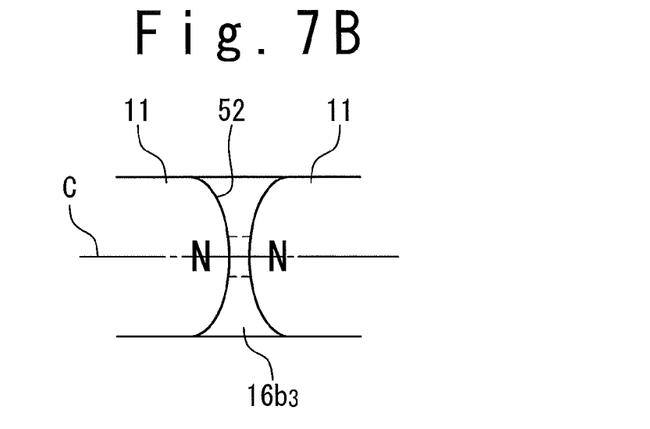
FIG. 7B is a schematic cross-sectional view illustrating still another example of the specific configuration of the intermediate member according to the second embodiment of the present invention.
Figure 7C:
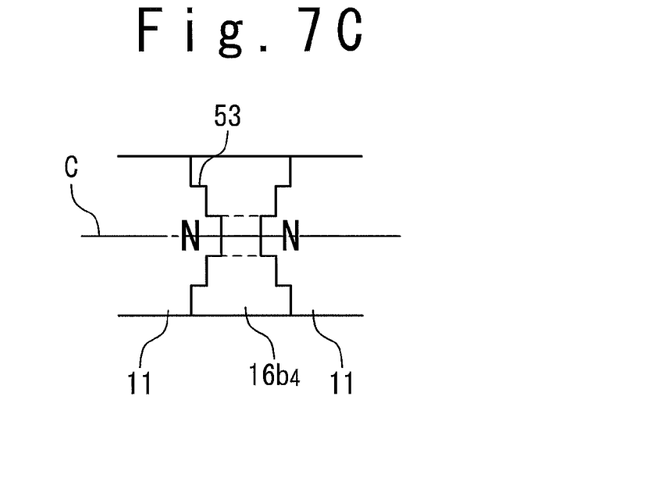
FIG. 7C is a schematic cross-sectional view illustrating yet another example of the specific configuration of the intermediate member according to the second embodiment of the present invention.

FIGS. 7A to 7C are schematic cross-sectional views illustrating other examples of the specific configuration of the intermediate member according to the second embodiment of the present invention. In these examples, the intermediate member 16 sandwiched between two N poles is described; however this case is the same as the case of the intermediate member 16 sandwiched between two S poles except for a direction of magnetic flux. The intermediate member 16 illustrated in FIG. 7A is a permanent magnet member $16b_2$ formed of a hard magnetic material (high coercive force material), and for example, a ferrite magnet and a rare earth magnet. The magnet member $16b_2$ has a thickness in a direction of the central axis C, which increases with increasing a distance from the central axis C. That is, on two surfaces in contact with the permanent magnets 11, concave portions 51 each having an inverted cone shape around the central axis C are present. Note that a plan view of the magnet member $16b_2$ arranged between two N poles and two S poles as viewed from the central axis C direction is the same as that in any of FIGS. 6B to 6D, and therefore description thereof is omitted.

A state of magnetic flux lines in FIG. 7A is the same as that in the case of FIG. 4B. Accordingly, a linear actuator using the magnetic member $16b_2$ in FIG. 7A can obtain the same effect as that in the case of FIG. 4B.

Further, the intermediate members 16 illustrated in FIGS. 7B and 7C are magnet members $16b_3$ and $16b_4$ each formed of a hard magnetic material (high coercive force material). These magnet members $16b_3$ and $16b_4$ are basically the same as the magnet member $16b_2$ (a thickness in the central axis C direction increases with increasing a distance from the central axis C). However, shapes of concave portions 52 and 53 around the central axis C are different from the concave portion 51 of the magnet member $16b_2$. That is, the magnet member $16b_3$ in FIG. 7B has a shape having the concave portions 52 each formed with a curved surface (shape like a concave lens). On the other hand, the magnet member $16b_4$ in FIG. 7C has a shape having the concave portions 53 each formed with a plurality of stair-like steps. In any of the shapes, the same effect as that in the shape of FIG. 7A can be obtained.

Figure 8:
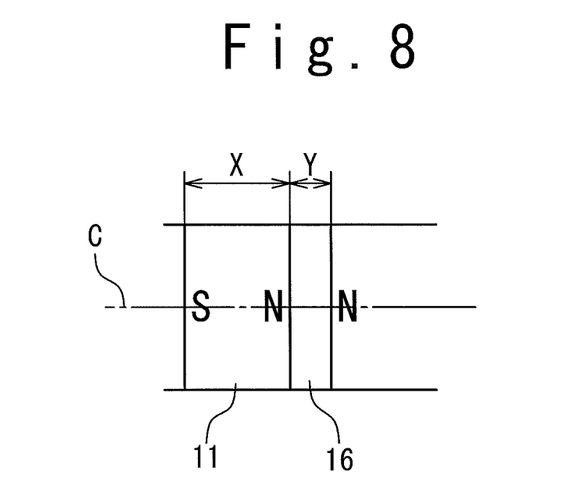
FIG. 8 is a schematic cross-sectional view illustrating a relationship in size between an intermediate member and a permanent magnet according to the second embodiment of the present invention.

FIG. 8 is a schematic cross-sectional view illustrating a relationship in size between the intermediate member and the permanent magnet according to the second embodiment of the present invention. As illustrated in the diagram, a thickness X of the permanent magnet 11 in a direction of the central axis C is preferably larger than a thickness Y of the magnet member 16 in the direction of the central axis C (X>Y). More preferably, X>Y>X/10. By configuring such a relationship, a magnetic flux density in a direction perpendicular to the central axis C at the position of the coil portion 3 can be further increased. According to such a size relationship, a volume of the permanent magnet 11 that mainly generates magnetic flux can be kept large, and a magnetic flux component perpendicularly passing through the coil portion 3 can be increased to further increase the thrust force of the linear actuator. For example, as compared with a result of an experiment under the same condition except for the insertion of the magnet members $16b_2$ and the relationship of X>Y>X/10, a thrust force increase of +9.1% has been verified.

Figure 9:
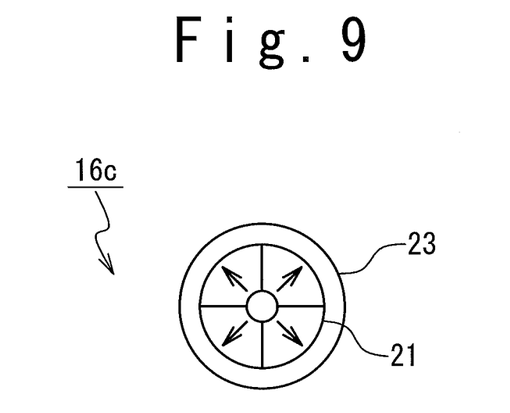
FIG. 9 is a schematic cross-sectional view illustrating further example of the specific configuration of the intermediate member according to the second embodiment of the present invention.

FIG. 9 is a schematic cross-sectional view illustrating still another example of the specific configuration of the intermediate member according to the second embodiment of the present invention. The intermediate member 16 illustrated in FIG. 9 is a combining member 16c having a shape in which a circular ring formed by combining fan-shaped magnets 21 is further surrounded by a circular ring formed of a soft magnetic member 23. That is, the intermediate member 16 has a configuration in which the above-described intermediate member of the first embodiment and the intermediate member of the second embodiment are combined. A reason to use the soft magnetic member 23 outside is because a site where magnetic fluxes are easily concentrated is the outside. That is, if a magnet is arranged outside, magnetic flux of the magnet itself is added; however, in a region outside of the magnet, magnetic fluxes are concentrated, which may cause magnetic saturation.

Regarding the configuration illustrated in the diagram, the effects of the present embodiment and the first embodiment can also be obtained. Also, the shape may be modified like those in FIGS. 4A, 4B, 5A, 5B, 7A, 7B, and 7C, and even in such a case, the effects of the present embodiment and the first embodiment can be obtained.

(Third Embodiment)

First, a configuration of a linear actuator according to a third embodiment of the present invention will be described.

Figure 10:
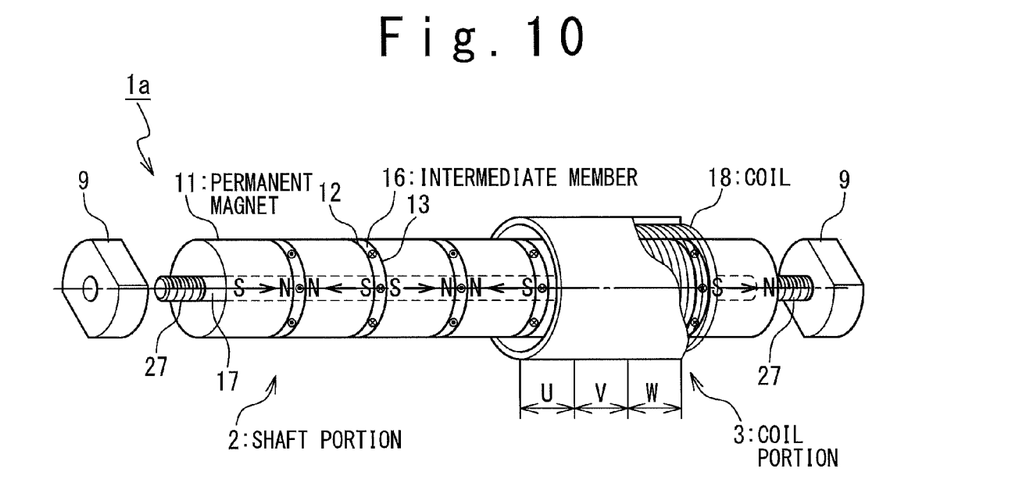
FIG. 10 is a schematic perspective view illustrating a configuration of a linear actuator according to a third embodiment of the present invention.

FIG. 10 is a schematic perspective view illustrating the configuration of the linear actuator according to the third embodiment of the present invention. The linear actuator 1a of the third embodiment is different from those of the first and second embodiments (FIGS. 2A and 2B) in that the linear actuator 1a of the third embodiment includes a fixed shaft 17 and does not include the outer cylinder 14.

The fixed shaft member 17 is provided in the shaft portion 2, and passes through the plurality of permanent magnets 11 and the plurality of intermediate members 16 in a direction of the central axis C. The fixed shaft member 17 is formed of a nonmagnetic material such that magnetic flux hardly passes through to prevent the magnetic flux from escaping to a path other than a coil portion 3. The fixed shaft member 17 has a substantially columnar shape (columnar rod-like shape), and a central axis thereof corresponds to the central axis C. At both ends of the fixed shaft member 17, for example, male screws 27 are provided. Also, by tightening the mail screws 27 with female screw members 9 from the both ends of the fixed shaft member 17, the plurality of permanent magnets 11 and plurality of intermediate members 16 can be easily fixed.

Figure 11:
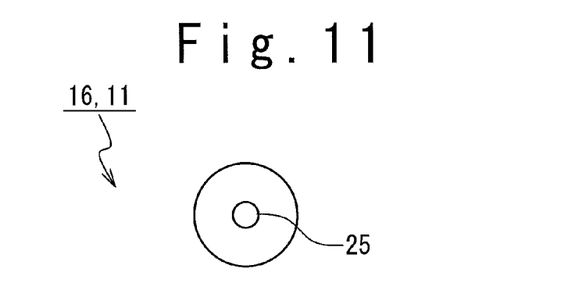
FIG. 11 is a schematic plan view illustrating configurations of a permanent magnet and an intermediate member according to the third embodiment of the present invention.

FIG. 11 is a schematic plan view illustrating configurations of the permanent magnet 11 and the intermediate member according to the third embodiment of the present invention. In this case, the permanent magnet 11 and the intermediate member 16 respectively have circular ring shapes each having in the center an opening 25 having the same diameter as that of the fixed shaft member 17. The intermediate member 16 may be formed into any of the shapes in FIGS. 3A and 3B to FIG. 9 described in the first and second embodiments, and even in such a case, the same effects as those in the first and second embodiments can be obtained.

By employing the configuration as described above, it becomes unnecessary to use the outer cylinder 14 of the shaft portion 2 used to fix the permanent magnets 11 and the intermediate members 16. This enables a magnetic air gap between the permanent magnets 11 and the coils 18 to be reduced. As a result, the coils 18 can be arranged at a position where a magnetic flux density is high, and thereby the thrust force of the linear actuator can be increased. Note that the thin outer cylinder 14 not influencing the air gap may be used to protect surfaces of the permanent magnets 11 and intermediate members 16.

Note that, in any of the first to third embodiments, the linear actuator is described in which the shaft portion 2 is relatively long whereas the coil portion 3 is relatively short, and as a result, the coil portion 3 looks like a mover. However, even in such a case, the linear actuator may be configured to make the shaft portion 2 serve as a mover.

Figure 12:
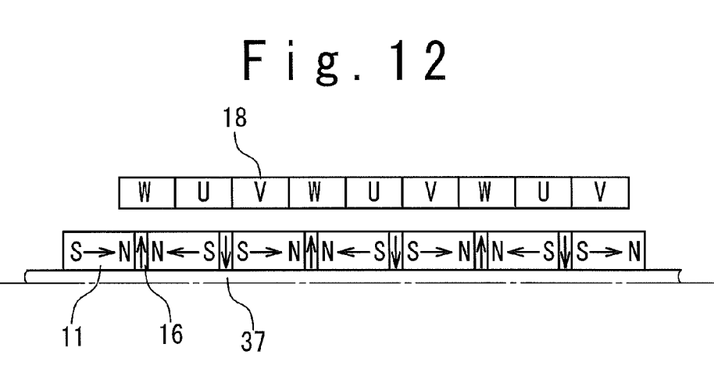
FIG. 12 is a schematic view illustrating a variation of the configuration of the linear actuator according to any of the first to third embodiments of the present invention.

Also, in any of the first to third embodiments, there may be employed a configuration in which the coils 18 are continuously arranged in the direction of the central axis C to elongate the coil portion 3 and the permanent magnets 11 and intermediate members 16 are made to serve as a mover that moves on a shaft member passing through them. FIG. 12 is a schematic view illustrating a variation of the configuration of the linear actuator according to any of the first to third embodiments of the present invention. In the linear actuator, inside the coil portion 3 in which a plurality of sets of U phase coil 18-1/V phase coil 18-2/W phase coil 18-3 are arranged, a structure of, for example, one period including permanent magnet 11/intermediate member 16/permanent magnet 11/intermediate member 16 moves on a shaft member 37. Even in this case, the same intermediate member 16 as that in any of the above first to third embodiments can be used. This enables the same effect as that in any of the above respective embodiments to be obtained.

Also, in the linear actuator of any of the first to third embodiments, cross-sectional shapes of the shaft portion 2 and coil portion 3 perpendicular to the central axis C are respectively circular shapes. However, the present invention is not limited to this, but the cross-sectional shapes perpendicular to the central axis C maybe polygonal shapes (not illustrated). For example, a triangular, a quadrangular, a hexagonal, an octagonal, or a dodecagonal shape may be employed. In such a case, the cross-sectional shapes are polygonal shapes, and therefore when a mover, for example, the coil portion 2 moves, rotation in a circumferential direction can be made difficult, and therefore the linear actuator can be used for an application where relative rotational operation is not preferable.

According to the present invention, by guiding magnetic fields on the basis of the action of the intermediate member such as a yoke member or magnet member so as to prevent permanent magnets adjacent to each other from mutually weakening the magnetic fields as occurring in the conventional linear actuator, a magnetic flux density in the perpendicular direction can be increased at a position of the coil to increase the operating thrust force of the linear actuator.

Although the present invention has been described above in connection with several embodiments thereof, it would be apparent to those skilled in the art that those embodiments are provided solely for illustrating the present invention, and should not be relied upon to construe the appended claims in a limiting sense.

It is apparent that the present invention is not limited to the above embodiments, but may be modified and changed without departing from the scope and spirit of the invention. Further, the techniques of the respective embodiments can be applied to other embodiments unless technical contradiction occurs among them.

This application is based upon and claims the benefit of priority from Japanese patent application No. 2008-284380 filed on Nov. 5, 2008, the disclosure of which is incorporated herein in its entirety by reference.

The invention claimed is:

1. A linear actuator comprising:
a coil portion including a plurality of coils, said coils adapted to receive AC currents respectively having different phases from one another; and
a shaft portion configured to pass through a center of said plurality of coils, wherein said shaft portion includes:
a plurality of permanent magnets located along a central axis such that adjacent pairs of said plurality of permanent magnets have a same pole facing each other along the central axis; and
a plurality of intermediate members, each of said intermediate members being located between an adjacent pair of said plurality of permanent magnets,
wherein each of said plurality of intermediate members has a saturation magnetic flux density that is higher than a saturation magnetic flux density of each of said plurality of permanent magnets,
wherein each of said plurality of intermediate members has a thickness in the central axis direction that increases further from the central axis, and
wherein each of said plurality of permanent magnets has a thickness in the central axis direction that decreases further from the central axis.

2. The linear actuator according to claim 1, wherein the thickness of each of said plurality of intermediate members in the central axis direction is thinner than the thickness of each of said plurality of permanent magnets in the central axis direction.

3. The linear actuator according to claim 1, wherein said shaft portion further includes:
a fixed shaft member that penetrates through said plurality of permanent magnets and said plurality of intermediate members to fix said plurality of permanent magnets and said plurality of intermediate members.

4. The linear actuator according to claim 1, wherein said shaft portion and said coil portion have cross-sectional shapes perpendicular to the central axis that are polygonal.

5. The linear actuator according to claim 1, wherein each of said intermediate members has concave portions on two surfaces that are in contact with two adjacent permanent magnets of said plurality of permanent magnets, each of said concave portions having one of an inverted cone shape, a curved shape and a stair step shape.

6. A linear actuator comprising:
a coil portion including a plurality of coils, said coils adapted to receive AC currents respectively having different phases from one another; and
a shaft portion configured to pass through a center of said plurality of coils, wherein said shaft portion includes:
a plurality of permanent magnets located along a central axis such that adjacent pairs of said plurality of permanent magnets have a same pole facing each other along the central axis; and
a plurality of intermediate members, each of said intermediate members being located between an adjacent pair of said plurality of permanent magnets,
wherein said plurality of intermediate members includes a plurality of permanent magnets that are located along the central axis such that magnetic directions are perpendicularly outward and perpendicularly inward, alternately, with respect to the central axis,
wherein each of said plurality of intermediate members has a thickness in the central axis direction that increases further from the central axis, and
wherein each of said plurality of permanent magnets has a thickness in the central axis direction that decreases further from the central axis.

7. The linear actuator according to claim 6, wherein each of said permanent magnets of said plurality of intermediate members includes a plurality of fan-shaped magnets formed into a circular ring shape.

8. The linear actuator according to claim 6, wherein the thickness of each of said plurality of intermediate members in the central axis direction is thinner than the thickness of each of said plurality of permanent magnets in the central axis direction.

9. The linear actuator according to claim 6, wherein said shaft portion further includes:
a fixed shaft member that penetrates through said plurality of permanent magnets and said plurality of intermediate members to fix said plurality of permanent magnets and said plurality of intermediate members.

10. The linear actuator according to claim 6, wherein said shaft portion and said coil portion have cross-sectional shapes perpendicular to the central axis that are polygonal.

11. The linear actuator according to claim 6, wherein each of said intermediate members has concave portions on two surfaces that are in contact with two adjacent permanent magnets of said plurality of permanent magnets, each of said concave portions having one of an inverted cone shape, a curved shape and a stair step shape.

12. A linear actuator comprising:
a coil portion including a plurality of coils, said coils adapted to receive AC currents respectively having different phases from one another; and
a shaft portion configured to pass through a center of said plurality of coils,
wherein said shaft portion includes:
a plurality of permanent magnets located along a central axis such that adjacent pairs of said plurality of permanent magnets have a same pole facing each other along the central axis; and
a plurality of intermediate members, each of said intermediate members being located between an adjacent pair of said plurality of permanent magnets,
wherein said plurality of intermediate members includes:
a plurality of permanent magnets located along the central axis such that magnetization directions are perpendicularly outward and perpendicularly inward, alternately, along the central axis; and
a plurality of combining members located around said permanent magnets, each of said plurality of combining members having a saturation magnetic flux density higher than a saturation magnetic flux density of each of said plurality of permanent magnets,
wherein each of said plurality of intermediate members has a thickness in the central axis direction that increases further from the central axis, and
wherein each of said plurality of permanent magnets has a thickness in the central axis direction that decreases further from the central axis.

13. The linear actuator according to claim 12, wherein each of said permanent magnets of said plurality of intermediate members includes a plurality of fan-shaped magnets formed into a circular ring shape.

14. The linear actuator according to claim 12, wherein the thickness of each of said plurality of intermediate members in the central axis direction is thinner than the thickness of each of said plurality of permanent magnets in the central axis direction.

15. The linear actuator according to claim 12, wherein said shaft portion further includes:
a fixed shaft member that penetrates through said plurality of permanent magnets and said plurality of intermediate members to fix said plurality of permanent magnets and said plurality of intermediate members.

16. The linear actuator according to claim 12, wherein said shaft portion and said coil portion have cross-sectional shapes perpendicular to the central axis that are polygonal.

17. The linear actuator according to claim 12, wherein each of said intermediate members has concave portions on two surfaces that are in contact with two adjacent permanent magnets of said plurality of permanent magnets, each of said concave portions having one of an inverted cone shape, a curved shape and a stair step shape.

18. A linear actuator comprising:
a coil portion including a plurality of coils, said coils adapted to receive AC currents respectively having different phases from one another; and
a shaft portion configured to pass through a center of said plurality of coils,
wherein said shaft portion includes:
a plurality of permanent magnets located along a central axis such that adjacent pairs of said plurality of permanent magnets have a same pole facing each other along the central axis; and
a plurality of intermediate members, each of said intermediate members being located between an adjacent pair of said plurality of permanent magnets,
wherein each of said plurality of intermediate members has a saturation magnetic flux density that is higher than a saturation magnetic flux density of each of said plurality of permanent magnets, and
wherein each of said plurality of intermediate members has a thickness in the central axis direction that monotonically increases further from the central axis.

19. A linear actuator comprising:
a coil portion including a plurality of coils, said coils adapted to receive AC currents respectively having different phases from one another; and
a shaft portion configured to pass through a center of said plurality of coils,
wherein said shaft portion includes:
a plurality of permanent magnets located along a central axis such that adjacent pairs of said plurality of permanent magnets have a same pole facing each other along the central axis; and
a plurality of intermediate members, each of said intermediate members being located between an adjacent pair of said plurality of permanent magnets,
wherein said plurality of intermediate members includes a plurality of permanent magnets that are located along the central axis such that magnetic directions are perpendicularly outward and perpendicularly inward, alternately, with respect to the central axis, and
wherein each of said plurality of intermediate members has a thickness in the central axis direction that monotonically increases further from the central axis.

20. A linear actuator comprising:
a coil portion including a plurality of coils, said coils adapted to receive AC currents respectively having different phases from one another; and
a shaft portion configured to pass through a center of said plurality of coils,
wherein said shaft portion includes:
a plurality of permanent magnets located along a central axis such that adjacent pairs of said plurality of permanent magnets have a same pole facing each other along the central axis; and
a plurality of intermediate members, each of said intermediate members being located between an adjacent pair of said plurality of permanent magnets,
wherein said plurality of intermediate members includes:
a plurality of permanent magnets located along the central axis such that magnetization directions are perpendicularly outward and perpendicularly inward, alternately, along the central axis; and
a plurality of combining members located around said permanent magnets, each of said plurality of combining members having a saturation magnetic flux density higher than a saturation magnetic flux density of each of said plurality of permanent magnets, and
wherein each of said plurality of intermediate members has a thickness in the central axis direction that monotonically increases further from the central axis.

* * * * *